United States Patent
Vincent et al.

(10) Patent No.: US 11,116,306 B2
(45) Date of Patent: Sep. 14, 2021

(54) CLEANING APPLIANCE

(71) Applicant: Dyson Technology Limited, Wiltshire (GB)

(72) Inventors: Christopher Graham Vincent, Swindon (GB); Robert Lawrence Tweedie, Swindon (GB); Jason Godfrey Jones, Bristol (GB); Robert Stefan Wronski, Bristol (GB); Philip Stephen Darling, Bristol (GB); Edward Michael Waugh, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 551 days.

(21) Appl. No.: 15/714,219

(22) Filed: Sep. 25, 2017

(65) Prior Publication Data
US 2018/0084898 A1 Mar. 29, 2018

(30) Foreign Application Priority Data

Sep. 26, 2016 (GB) ..................................... 1616272

(51) Int. Cl.
*A46B 11/00* (2006.01)
*A61C 17/028* (2006.01)
(Continued)

(52) U.S. Cl.
CPC ...... *A46B 11/0006* (2013.01); *A46B 11/0055* (2013.01); *A46B 11/0062* (2013.01);
(Continued)

(58) Field of Classification Search
CPC .............. A46B 11/0006; A46B 11/002; A46B 11/0041; A46B 11/0055; A46B 11/0058;
(Continued)

(56) References Cited

U.S. PATENT DOCUMENTS 2,978,722 A    4/1961   Kusakabe
3,589,839 A * 6/1971   Johnson .................. F01L 23/00
                                                                 417/391
(Continued)

FOREIGN PATENT DOCUMENTS

CN       202476824      10/2012
CN       203829079       9/2014
(Continued)

OTHER PUBLICATIONS

Search Report dated Mar. 1, 2017, directed to GB Application No. 1616272.9; 2 pages.
(Continued)

*Primary Examiner* — Justine R Yu
*Assistant Examiner* — Matthew D Ziegler
(74) *Attorney, Agent, or Firm* — Faegre Drinker Biddle & Reath LLP

(57) ABSTRACT

A pump assembly for a dental cleaning appliance includes a fluid chamber, a piston, and a drive. Magnets, connected respectively to the piston and the drive, enable the drive to couple to the piston and move it within the fluid chamber to draw fluid into the fluid chamber. A stop prevents the piston from being pulled beyond a stop position so that through continued actuation of the drive the magnets separate to allow a spring to push the piston away from the stop position to urge a burst of fluid from the fluid chamber.

19 Claims, 12 Drawing Sheets

(51) Int. Cl.
| | |
|---|---|
| *A61C 17/34* | (2006.01) |
| *A61C 17/22* | (2006.01) |
| *A61C 17/02* | (2006.01) |
| *A61C 17/16* | (2006.01) |
| *A46B 15/00* | (2006.01) |
| *A61C 1/00* | (2006.01) |
| *F04B 9/02* | (2006.01) |
| *F04B 19/22* | (2006.01) |
| *F04B 23/02* | (2006.01) |

(52) U.S. Cl.
 CPC ...... *A46B 11/0096* (2013.01); *A46B 15/0004* (2013.01); *A46B 15/0044* (2013.01); *A61C 17/0202* (2013.01); *A61C 17/028* (2013.01); *A61C 17/16* (2013.01); *A61C 17/227* (2013.01); *A61C 17/3427* (2013.01); *A46B 2200/1066* (2013.01); *A61C 1/0092* (2013.01); *F04B 9/02* (2013.01); *F04B 19/22* (2013.01); *F04B 23/02* (2013.01)

(58) Field of Classification Search
 CPC . A46B 11/0062; A46B 11/0096; A46B 13/04; A46B 15/0004; A46B 15/0044; A46B 2200/1066; A61C 1/0061; A61C 1/0084; A61C 1/0092; A61C 17/02; A61C 17/0202; A61C 17/028; A61C 17/16; A61C 17/22; A61C 17/221; A61C 17/222; A61C 17/225; A61C 17/227; A61C 17/24; A61C 17/26; A61C 17/28; A61C 17/32; A61C 17/34; A61C 17/3427; A61C 17/36; F04B 9/02–06; F04B 17/03; F04B 19/22; F04B 23/02; F04B 53/00; F04B 35/01; F04D 13/021; F04D 13/022; F04C 15/0073; F04C 29/0071
 USPC .................. 417/223; 74/25, 53; 30/392–394; 601/107, 108
 See application file for complete search history.

(56) References Cited

U.S. PATENT DOCUMENTS

| | | | | |
|---|---|---|---|---|
| 3,791,771 | A * | 2/1974 | Roesel, Jr. ............ | F04B 17/046 417/418 |
| 4,048,690 | A * | 9/1977 | Wolfson ................. | A61C 17/24 15/22.1 |
| 4,377,374 | A * | 3/1983 | Taylor ..................... | F01M 5/00 417/228 |
| 4,685,819 | A | 8/1987 | Endo | |
| 4,716,890 | A * | 1/1988 | Bichel ................... | A61H 23/04 601/108 |
| 4,747,396 | A * | 5/1988 | Richardson ............ | A61H 23/06 601/107 |
| 5,046,486 | A | 9/1991 | Grulke et al. | |
| 5,088,903 | A * | 2/1992 | Tomatsu ................. | B05B 7/12 239/526 |
| 5,399,089 | A | 3/1995 | Eichman et al. | |
| 5,662,461 | A * | 9/1997 | Ono ....................... | F04B 17/046 417/417 |
| 5,997,518 | A | 12/1999 | Laibovitz et al. | |
| 7,611,336 | B2 * | 11/2009 | Ikuta ....................... | F04B 53/22 417/15 |
| 7,993,108 | B2 * | 8/2011 | Rush .................. | A61M 5/14216 417/199.2 |
| 8,113,832 | B2 | 2/2012 | Snyder et al. | |
| 8,522,384 | B2 | 9/2013 | Leung | |
| 9,359,999 | B2 * | 6/2016 | Ohligschlaeger ..... | F04B 17/042 |
| 10,299,884 | B2 * | 5/2019 | Kloster ............... | A61C 17/0202 |
| 2005/0235975 | A1 * | 10/2005 | Pedicini .................. | F41B 11/64 124/67 |
| 2005/0244289 | A1 * | 11/2005 | Ikuta ...................... | F04B 53/147 417/415 |
| 2008/0097375 | A1 | 4/2008 | Bikovsky | |
| 2010/0167236 | A1 | 7/2010 | Edwards et al. | |
| 2014/0248579 | A1 | 9/2014 | Edwards et al. | |
| 2015/0238710 | A1 | 8/2015 | Vogt | |

FOREIGN PATENT DOCUMENTS

| | | |
|---|---|---|
| DE | 77 27 222 | 4/1978 |
| DE | 38 08 576 | 2/1989 |
| EP | 1327482 | 7/2003 |
| EP | 2746566 | 6/2014 |
| EP | 2863833 B1 | 9/2017 |
| GB | 1 583 558 | 1/1981 |
| GB | 2 229 791 | 10/1990 |
| GB | 2 302 499 | 1/1997 |
| GB | 2468254 | 3/2011 |
| GB | 2538306 | 11/2016 |
| JP | 60-138544 | 9/1985 |
| JP | 2015-527101 A | 9/2015 |
| WO | 92/08421 | 5/1992 |
| WO | WO-2009/077919 | 6/2009 |
| WO | WO-2010/028457 | 3/2010 |
| WO | WO-2010/055435 | 5/2010 |
| WO | WO-2011/007273 | 1/2011 |
| WO | WO-2013/190428 | 12/2013 |
| WO | WO-2014/087303 | 6/2014 |
| WO | 2014/140964 | 9/2014 |

OTHER PUBLICATIONS

Search Report dated Apr. 20, 2017, directed to GB Application No. 1616272.9; 2 pages.
Notice of Reasons for Rejection dated Dec. 10, 2018, directed to JP Application No. 2017-183418; 10 pages.
Search Report dated Nov. 7, 2018, directed to GB Application No. 1808360.0; 2 pages.
Search Report dated Nov. 7, 2018, directed to GB Application No. 1808361.8; 2 pages.
International Search Report and Written Opinion dated Mar. 11, 2017, directed to International Application No. PCT/GB2017/052517; 10 pages.
Notification of Reason for Refusal dated Oct. 27, 2020, directed to KR Application No. 10-2019-7008431; 13 pages.

* cited by examiner

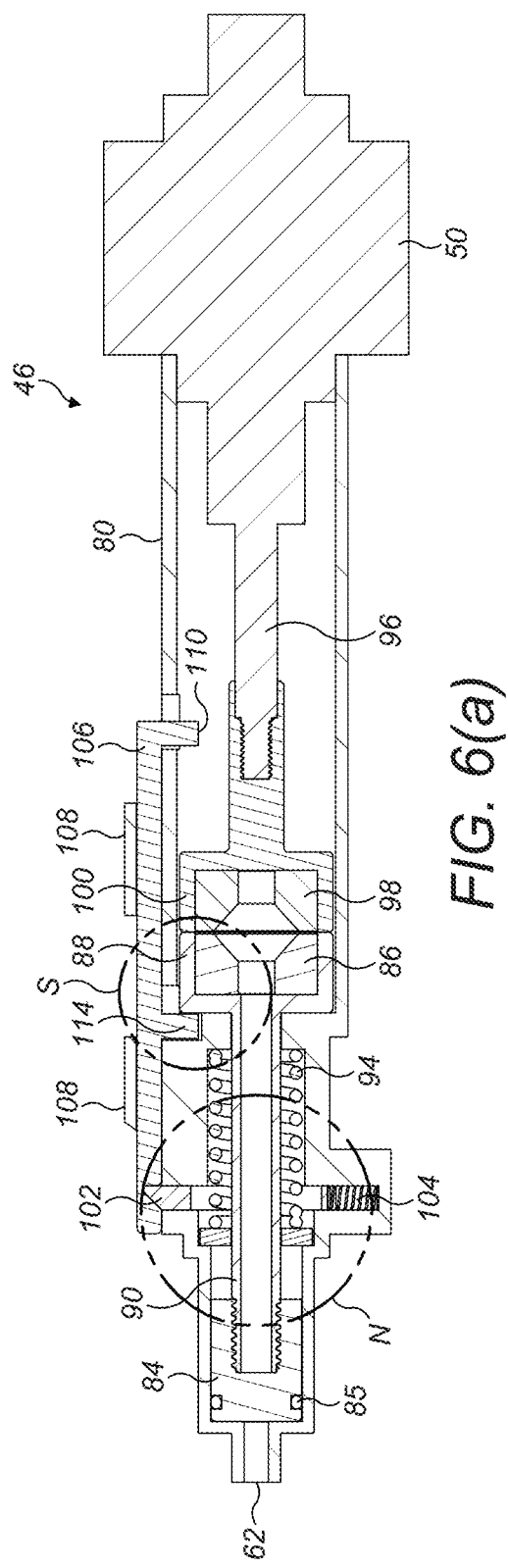
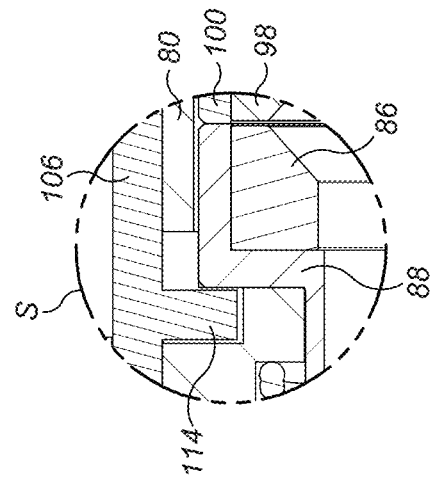
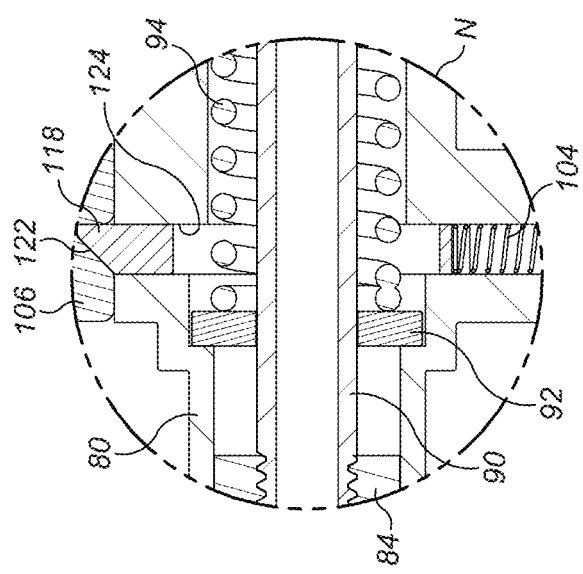
FIG. 6(a)
FIG. 6(c)
FIG. 6(b)

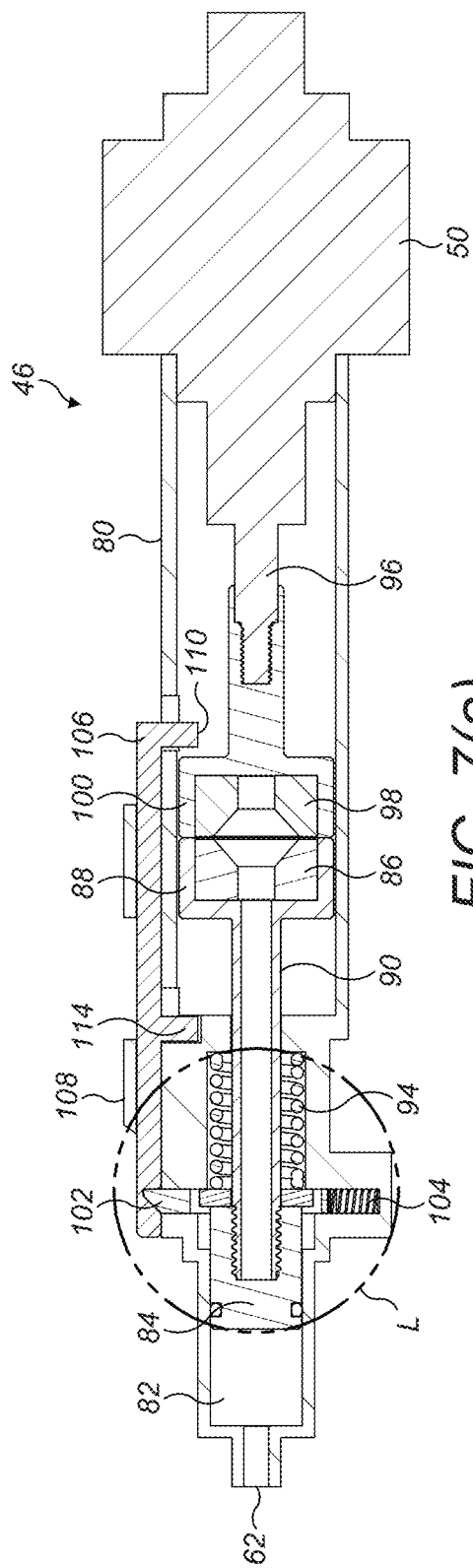
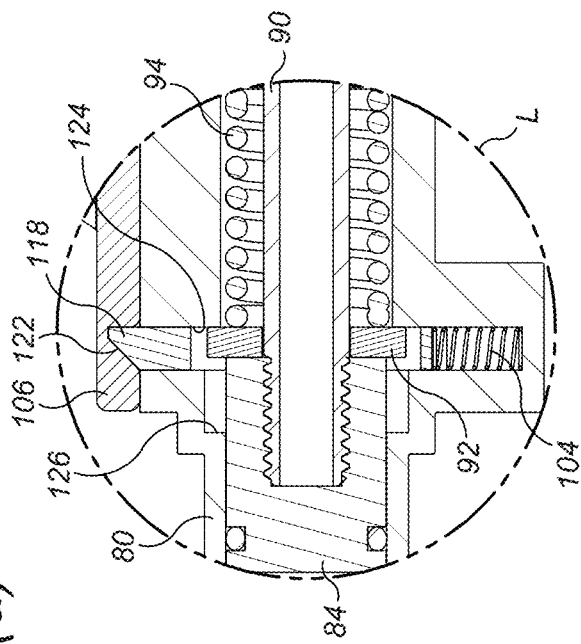
FIG. 7(a)
FIG. 7(b)

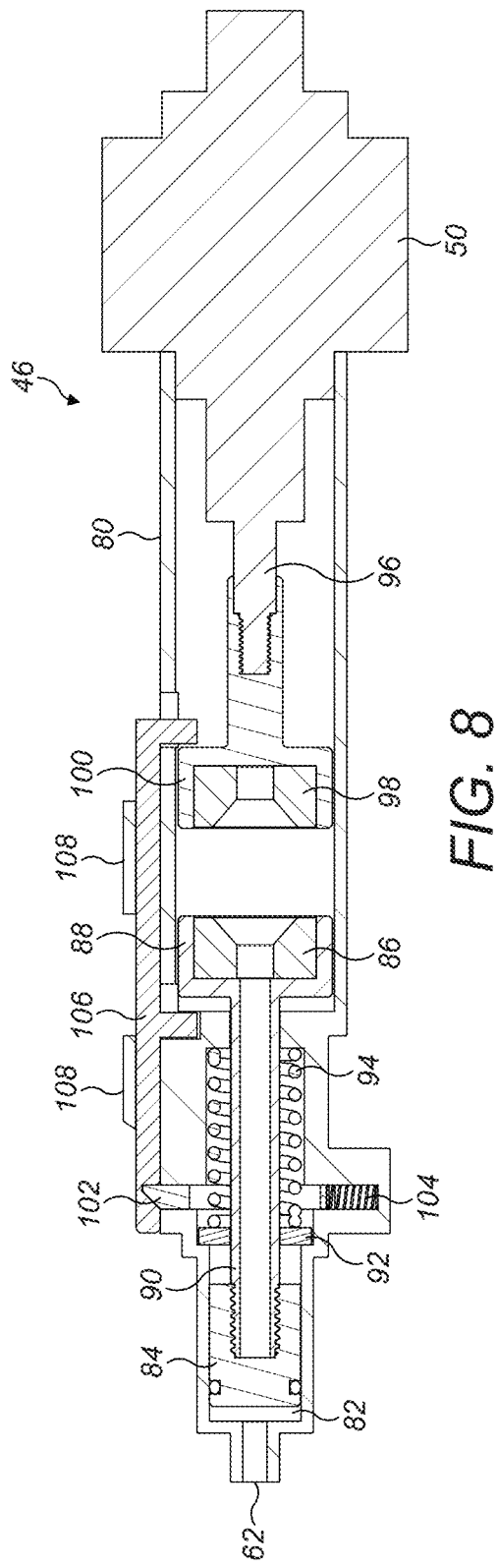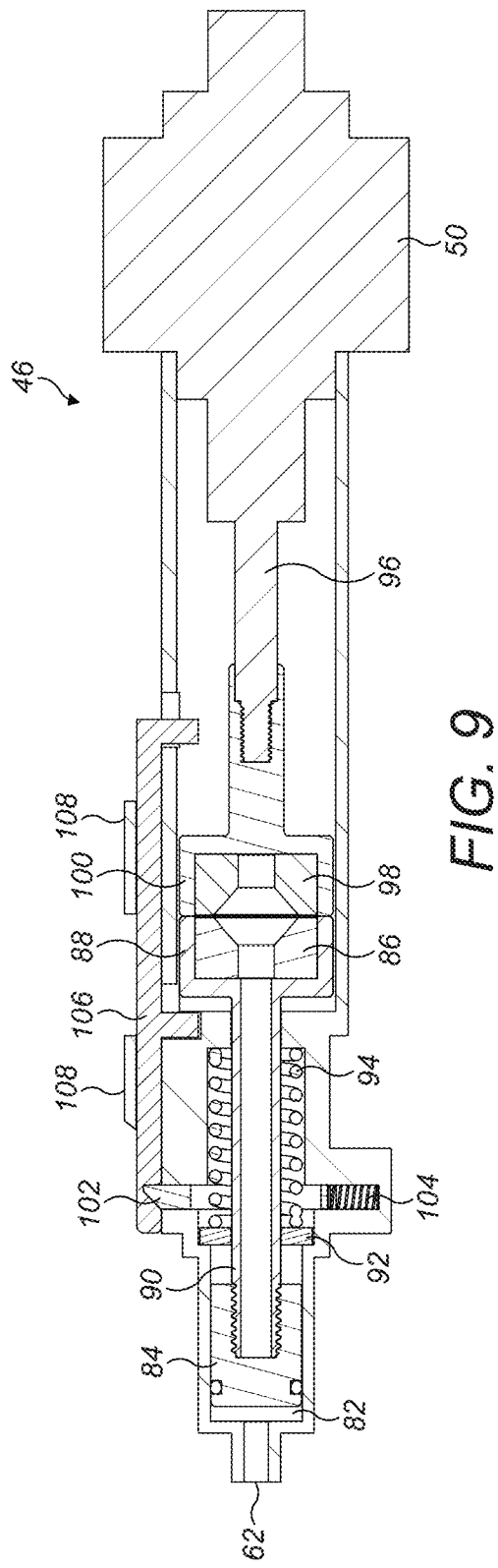

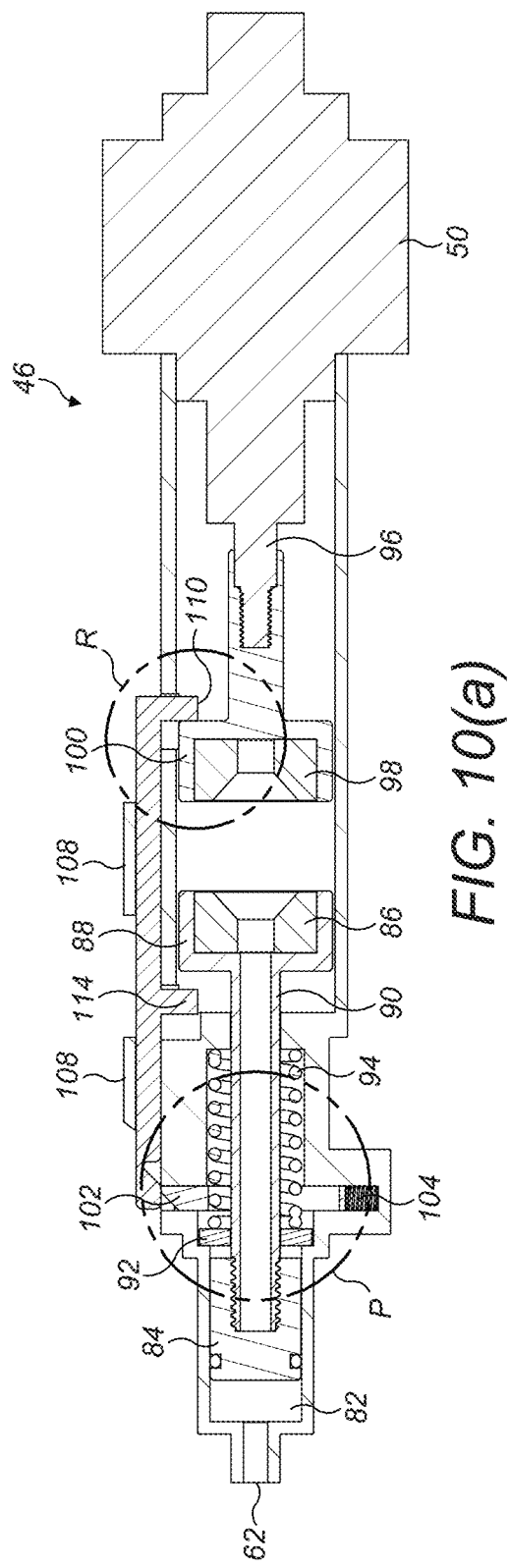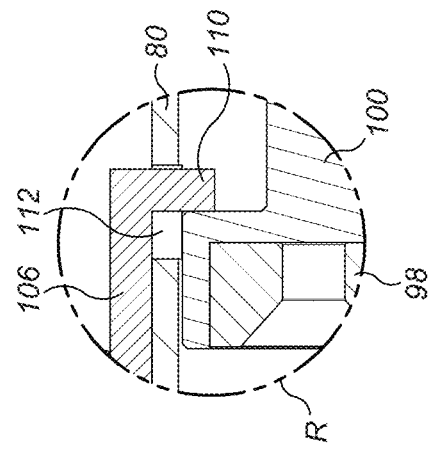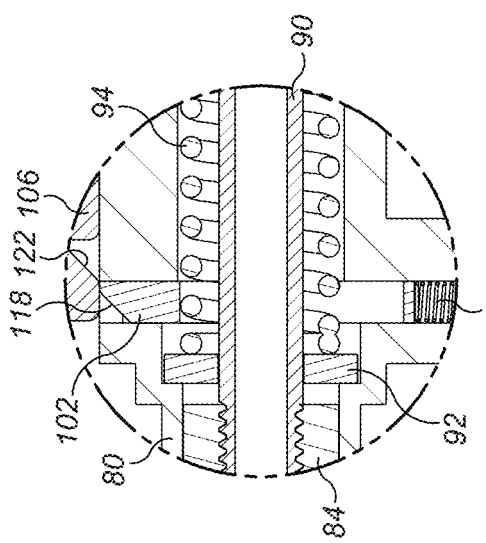
FIG. 10(a)
FIG. 10(b)
FIG. 10(c)

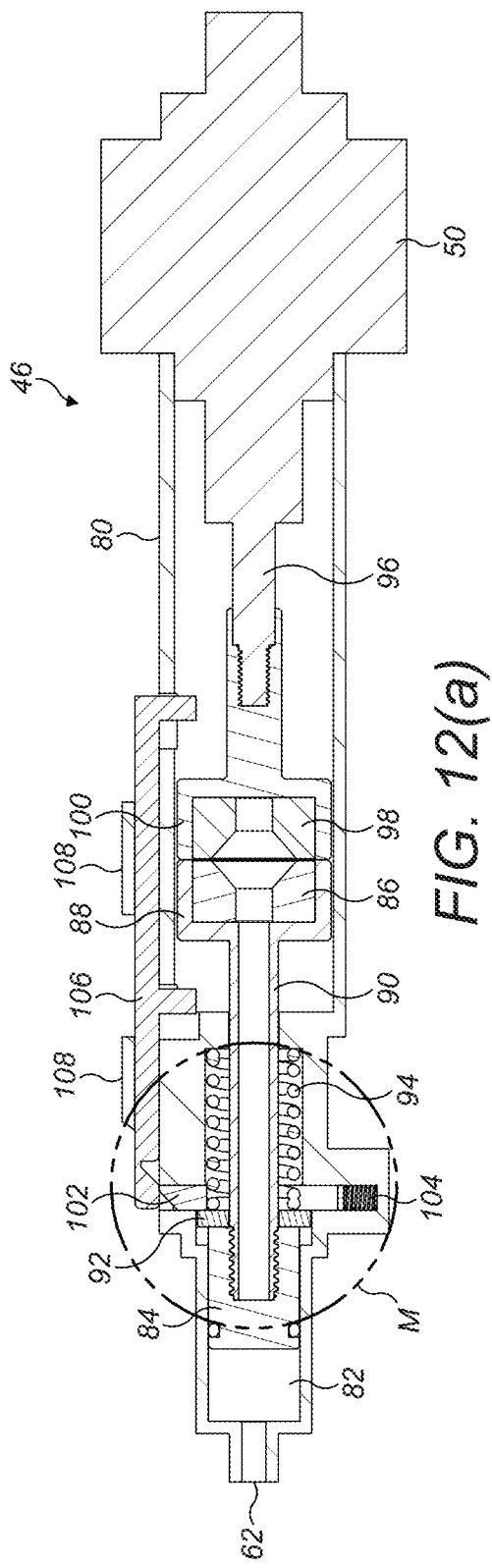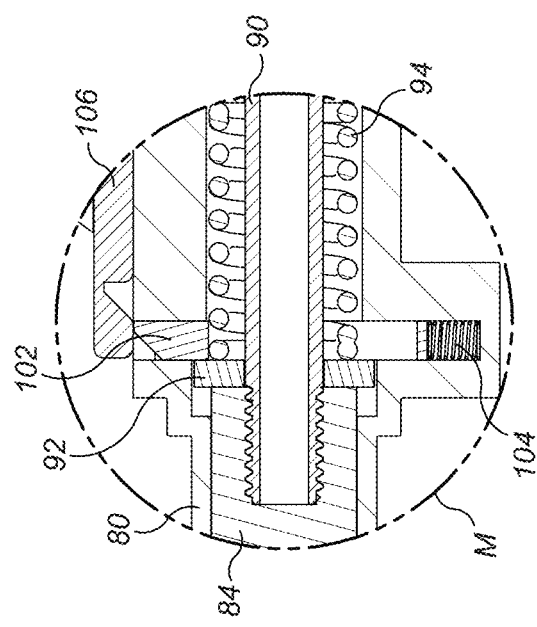
FIG. 12(a)
FIG. 12(b)

CLEANING APPLIANCE

REFERENCE TO RELATED APPLICATIONS

This application claims the priority of United Kingdom Application No. 1616272.9, filed Sep. 26, 2016, the entire contents of which are incorporated herein by reference.

FIELD OF THE INVENTION

The present invention relates to a pump assembly, and to a cleaning appliance which includes a pump assembly. The cleaning appliance is preferably a handheld cleaning appliance, and is preferably a surface treating appliance. In preferred embodiments of the invention, the appliance is a dental cleaning appliance. In a preferred embodiment, the appliance is a toothbrush having a fluid delivery system for delivering a fluid to the teeth of the user. This fluid may be toothpaste, or a fluid for improved interproximal cleaning. Alternatively, the appliance may not include any bristles or other elements for brushing teeth, and may be in the form of a dedicated interproximal cleaning appliance.

BACKGROUND OF THE INVENTION

Dental cleaning appliances can take one of a number of different formats. Electric toothbrushes generally comprise a cleaning tool which is connected to a handle. The cleaning tool comprises a stem and a brush head bearing bristles for brushing teeth. The brush head comprises a static section which is connected to the stem, and at least one moveable section which is moveable relative to the static section, for example with one of a reciprocating, oscillating, vibrating, pivoting or rotating motion, to impart a brushing movement to bristles mounted thereon. The stem houses a drive shaft which couples with a transmission unit within the handle. The transmission unit is in turn connected to a motor, which is driven by a battery housed within the handle. The drive shaft and the transmission unit convert rotary or vibratory motion of the motor into the desired movement of the moveable section of the brush head relative to the static section of the brush head.

It is known to incorporate into an electric toothbrush an assembly for generating a jet of fluid for interproximal cleaning. For example, U.S. Pat. No. 8,522,384 describes an electric toothbrush in which the handle of the toothbrush defines a fluid chamber for storing a liquid such as water, and a slidable cover for enabling the fluid chamber to be accessed for replenishment by a user. A fluid path connects the fluid chamber to a nozzle located on a static portion of the brush head. A pump located within the fluid path is actuated upon user operation of an actuator on the handle to pump fluid from the fluid chamber to the nozzle for release under pressure from the nozzle.

The pump is actuated by a motor. The motor rotates a pinion gear, which meshes with a crown gear to drive rotation of the crown gear about an axis orthogonal to the axis of rotation of the pinion gear. The rotation of the crown gear effects reciprocal movement of a pump crank shaft. The crank shaft is pivotally coupled to a piston which is moveable within a pump housing which receives fluid from the fluid chamber. The reciprocating movement of the crank shaft causes the piston to move in an oscillating manner within the pump housing to draw fluid into the pump housing and subsequently drive that fluid from the pump housing towards the nozzle.

SUMMARY OF THE INVENTION

In a first aspect, the present invention provides a pump assembly for a dental cleaning appliance, the pump assembly comprising a positive displacement pump comprising a fluid chamber having a fluid inlet connectable to a source of fluid, and a fluid outlet; a drive for actuating the pump to draw fluid into the fluid chamber through the fluid inlet; an energy storage device for converting kinetic energy generated during actuation of the pump by the drive into potential energy, and storing the potential energy; a first coupling member connected to the pump and a second coupling member connected to the drive, the coupling members coupling together magnetically to enable the drive to actuate the pump to draw fluid into the fluid chamber, and decoupling means for decoupling the coupling members to enable the energy storage device to use stored potential energy to actuate the pump to urge a burst of fluid from the fluid chamber through the fluid outlet.

Through using magnetism to couple together the two coupling members, the noise generated as the coupling members couple together, and subsequently decouple from each other, can be relatively low in comparison to coupling members which connect mechanically to each other, for example using meshing teeth. In comparison to such coupling members, the degree of mechanical wear of the coupling members during use of the pump assembly is very low.

The drive preferably comprises a motor, an actuator connected to the drive and the second coupling member, and a control circuit for driving the motor to move the second coupling member relative to the fluid chamber. The actuator is preferably a linear actuator, in a preferred embodiment in the form of a drive rod, which moves along a linear path to move the second coupling member relative to the fluid chamber. One or more gears may be connected between the motor and the actuator to convert rotary motion of the motor into linear motion of the actuator. For example, the actuator may comprise a lead screw driven by one or more gears which engages with a nut that is constrained from axial rotation, thus creating a linear motion from the rotary input.

The positive displacement pump preferably comprises a fluid displacement member which is moveable relative to the fluid chamber to draw fluid into the fluid chamber, and to subsequently urge a burst of fluid from the fluid chamber. The fluid displacement member is preferably moveable along a linear path relative to the fluid chamber. In a preferred embodiment, the positive displacement pump is in the form of a piston pump, in which the fluid displacement member is a piston which is reciprocally movable within the fluid chamber between a first position and a second position to draw fluid into the fluid chamber and to subsequently urge that fluid from the fluid chamber.

Preferably, a connecting rod connects the first coupling member to the fluid displacement member. The connecting rod is preferably linear in shape, and has a longitudinal axis which passes through the centre of the fluid displacement member. The fluid displacement member and the first coupling member are preferably located at opposite ends of the connecting rod. The fluid displacement member, the first coupling member and the connecting rod preferably form a driven assembly of the pump.

In order to draw a volume of fluid, preferably a liquid such as water, into the fluid chamber, the drive is operated in a first direction to move the second coupling member towards the first coupling member to engage the first coupling member and so connect the drive magnetically to the fluid displacement member, for example through magnetic attraction between the coupling members. Once the coupling members have been coupled together, the drive is operated in a reverse direction to move the fluid displacement member from the first position to the second position to draw a volume of fluid into the fluid chamber through the fluid inlet.

The drive may move the second coupling member at different speeds depending on its direction of movement relative to the pump housing. For example, the speed at which the drive moves the second coupling member towards the first coupling member may be higher than the speed at which it moves the second coupling member when coupled to the first coupling member, and thus move the fluid displacement member relative to the fluid chamber. Increasing the speed at which the drive moves the second coupling member towards the first coupling member can reduce the interval between successive ejections of fluid from the pump, whereas lowering the speed at which it moves the second coupling member when coupled to the first coupling member can reduce the likelihood of air cavities being generated within the liquid drawn into the fluid chamber.

One of the coupling members, for example the first coupling member, may comprise an electromagnet. The electromagnet may be selectively activated by a control circuit to couple together the coupling members, and subsequently deactivated by the control circuit to decouple the coupling members, and so release the fluid displacement member from the drive. The timing of the activation and the deactivation of the electromagnet can be controlled depending on the position of the electromagnet relative to the pump housing. The position of the electromagnet can be determined from the output of a sensor, or from the duration and speed of operation of the drive for moving the electromagnet in a chosen direction relative to the pump housing. For instance, the electromagnet may be activated when the first coupling member has been moved by the drive adjacent to, or so as to engage, the second coupling member. When the coupling members are coupled together, the position of the fluid displacement member within the fluid chamber is directly related to the position of the electromagnet relative to the pump housing, and so the deactivation of the electromagnet can be timed so that the fluid displacement member is released from the drive after a chosen volume of fluid has been drawn into the fluid chamber.

Where one of the coupling members comprises an electromagnet, the other coupling member, in this example the second coupling member, may comprise a first permanent magnet which is attracted to the activated electromagnet to couple the pump to the drive. Alternatively, the second coupling member may be formed from ferromagnetic material.

Alternatively, the first coupling member may comprise a first permanent magnet connected to the drive. In this case, the second coupling member may comprise a second permanent magnet of reverse polarity to the first permanent magnet. Alternatively, the second coupling member may be formed from ferromagnetic material which is attracted to the first permanent magnet to couple the pump to the drive.

As mentioned above, the decoupling means may comprise a control circuit for deactivating an electromagnet which provides the second coupling member. Alternatively, when the first coupling member comprises ferromagnetic material and the second coupling member comprises a permanent magnet the decoupling means may comprise a coil which extends about the first coupling member. The control circuit may energize the coil to generate a magnetic field in the ferromagnetic material which interferes with the magnetic field generated by that permanent magnet. The size of the magnetic field generated by the coil is preferably such that the force of magnetic attraction between the coupling members is reduced to a level which is lower than a force which is applied to the pump by the energy storage device, so energizing the coil results in the actuation of the pump by the energy storage device to urge fluid from the fluid chamber.

As another alternative, and particularly when the first coupling member comprises a permanent magnet, the decoupling means may comprise a stop for inhibiting movement of the fluid displacement member beyond the second position. When the fluid displacement member has been drawn to the second position by the drive, continued operation of the drive causes the (moving) second coupling member to move away from the (now stationary) first coupling member. As the coupling members move apart, the force of magnetic attraction between the coupling members rapidly decreases. When the force of attraction between the coupling members has fallen below the force applied to the pump by the energy storage device, under the action of the energy storage device the fluid displacement member is moved rapidly towards the first position to urge a burst of fluid from the fluid chamber through the fluid outlet.

Thus, in an operational mode, the drive is preferably configured to (a) move the second coupling member in a first direction to engage the first coupling member and so connect the pump to the drive, (b) subsequently move the second coupling member in a second direction, opposite to the first direction, to draw the fluid displacement member to the second position, and so draw an amount of fluid into the fluid chamber through the fluid inlet, and (c) continue to move the second coupling member in the second direction to decouple the coupling members and so release the pump from the drive, whereupon the fluid displacement member moves towards the first position, under the action of the energy storage device, to urge a burst of fluid through the fluid outlet.

The stop preferably comprises an abutment member or surface which engages the fluid displacement member, or a component connected to or contacting the fluid displacement member, to inhibit movement of the fluid displacement member away from the first position beyond the second position. For example, the stop may engage a component of the driven assembly, or a component of the pump which is connected to, or engaged by, the driven assembly. The stop may be connected to any static component of the pump. For example, the stop may be connected to a pump housing which houses the driven assembly. In a preferred embodiment, the stop is provided by a surface of a wall of a housing of the pump.

For example, the pump may comprise a drive plate. The drive plate is preferably in the form of an annular disc through which the connecting rod passes to enable the drive plate to move relative to the driven assembly. The drive plate is located between the fluid displacement member and the first coupling member. The diameter of the aperture of the drive plate is preferably larger than the external diameter of the connecting rod so that the drive plate does not move with the first coupling member until it has been engaged by the fluid displacement member. The drive plate is preferably arranged to move with the fluid displacement member as the fluid displacement member is moved from a third position, which is intermediate the first position and second position, towards the second position. As the fluid displacement member moves to its second position, the stop engages the drive plate to inhibit movement of the fluid displacement member beyond the second position. In other words, when the fluid displacement member has been moved to its second position, the drive plate becomes sandwiched between the fluid displacement member and the stop, preventing further movement of the fluid displacement member away from its first position.

The energy storage device is preferably arranged to actuate the pump in reverse by urging the fluid displacement member towards its first position when the pump is decoupled from the drive. The energy storage device is preferably in the form of a spring, but alternatively it may be in the form of an accumulator. The energy storage device is preferably arranged to engage the drive plate. When the energy storage device is in the form of a spring, the spring becomes compressed as the fluid displacement member moves from the third position to the second position, converting kinetic energy into potential energy stored in the spring. When the pump is decoupled from the drive, the spring rapidly expands and pushes the drive plate away from the stop, and thus pushes the fluid displacement member towards its first position.

Preferably, a second stop is provided for preventing the drive plate from engaging the fluid displacement member when the fluid displacement member is located between the first position and the third position. As a result, the energy storage device does not act upon the fluid displacement member when the fluid displacement member is located between the first position and the third position, but only when the fluid displacement member is located between the third position and the second position. This allows the drive to be selectively operable in a purge mode, in which it is configured to reciprocally move the fluid displacement member between the first position and the third position to draw a volume of fluid through the fluid inlet and subsequently urge that volume of working fluid through the fluid outlet. This can allow a reservoir for supplying fluid to the fluid chamber to be emptied rapidly using the pump assembly, and without having to move the fluid displacement member against the energy storage device, and so allowing the purge mode to be operated with relatively low power consumption.

The second stop may also be connected to the pump housing or another static component of the pump assembly. In a preferred embodiment, the stop is provided by a surface of a second wall of the pump housing. The surfaces of the housing which provide the two stop members preferably face each other.

In addition to the stop for inhibiting movement of the fluid displacement member beyond the second position, the decoupling means may also comprise a moveable stop which is moveable between a stowed position and a deployed position for inhibiting movement of the fluid displacement member beyond an intermediate position located between the first position and the second position, and preferably located between the third position and the second position. Through changing the position at which the fluid displacement member becomes decoupled from the drive, the stroke of the fluid displacement member, and thus the volume of fluid which is drawn into the fluid chamber prior to the decoupling, can be varied. This can allow the drive to be operated selectively in two operational modes. In a first operational mode, in which the moveable stop is in its stowed position, the volume of fluid drawn into, and subsequently ejected from, the pump is relatively high. In a second operational mode, in which the moveable stop is in its deployed position, the volume of fluid drawn into, and subsequently ejected from, the pump is relatively low. In the first operational mode, the volume of fluid drawn into, and subsequently ejected from, the pump is preferably in the range from 0.15 to 0.25 ml. In the second operational mode, the volume of fluid drawn into, and subsequently ejected from, the pump is preferably in the range from 0.05 to 0.20 ml.

When in its deployed position, the moveable stop is preferably arranged to engage the drive plate. In other words, when the moveable stop is in its deployed position, the drive plate becomes instead sandwiched between the fluid displacement member and the moveable stop to prevent further movement of the fluid displacement member away from its first position. The moveable stop may be slidable, pivotable, rotatable or otherwise translatable between the deployed position and the stowed position. Alternatively, the moveable stop may be extendable or expandable. In a preferred embodiment, the moveable stop is slidable between the deployed position and the stowed position.

The moveable stop is preferably in the form of an annular disc which extends about the connecting rod of the driven assembly. The moveable stop preferably comprises a central aperture which has a diameter which is larger than the diameter of the periphery of the drive plate so that, when the moveable stop is in its stowed position, the drive plate passes through the central aperture without engaging the moveable stop. When the moveable stop is moved to its deployed position, part of the moveable stop moves into the path of the drive plate, preferably through the movement of the moveable stop in a direction which is orthogonal to the direction of movement of the drive plate, so that a surface of the moveable stop can engage the drive plate.

The decoupling means preferably comprises a spring for urging the moveable stop towards the stowed position and an actuator for selectively moving the moveable stop, against the force of the spring, towards the deployed position. The actuator may be moveable between a first actuator position, in which the moveable stop is in the stowed position, and a second actuator position, in which the moveable stop is in the deployed position. The actuator may also be slidable, pivotable, rotatable or otherwise translatable. Alternatively, the actuator may be extendable or expandable. In a preferred embodiment, the actuator is slidable between the two actuator positions.

The actuator may be moveable manually by the user, or by a dedicated drive mechanism for moving the actuator between the two actuator positions. In a preferred embodiment, the drive is arranged to move the actuator from the first actuator position to the second actuator position. The arm preferably comprises a finger which is engaged by the drive to effect this movement of the actuator. The reverse movement of the actuator from the second actuator position to the first actuator position is preferably also effected by the drive. The arm preferably comprises another finger which engaged by the driven assembly, under the action of the drive, to effect this reverse movement of the actuator. The arm is preferably located external of the housing of the pump, with the fingers protruding into the housing through respective apertures or slots formed in the housing.

Preferably, the fluid displacement member moves along a first linear path between its first position and its second position. The first coupling member, connected to the fluid displacement member by the connecting rod, similarly moves along a linear path which is co-axially aligned with the first linear path. The second coupling member, connected to the drive, preferably moves reciprocally along a second linear path. This second linear path is preferably parallel to, and more preferably co-axially aligned with, the first linear path of the fluid displacement member, and thus preferably also with the linear path of the first coupling member. This alignment of the paths of movement of the coupling members and the fluid displacement member can allow the pump assembly to have a relatively narrow profile. As the pump assembly is, in use, preferably located within the handle of a dental cleaning appliance, this can allow the handle to adopt a relatively narrow profile, which facilitates the gripping of the handle by the user during use of the appliance.

In a second aspect the present invention provides a pump assembly for a dental cleaning appliance, the pump assembly comprising a positive displacement pump comprising a fluid chamber having a fluid inlet connectable to a source of fluid, a fluid outlet, and a fluid displacement member; a drive for actuating the pump to move the fluid displacement member relative to the fluid chamber along a first linear path to draw fluid into the fluid chamber through the fluid inlet; an energy storage device for converting kinetic energy generated during actuation of the pump by the drive into potential energy, and storing the potential energy; a first coupling member connected to the pump and a second coupling member connected to the drive, the coupling members coupling together to enable the drive to actuate the pump to draw fluid into the fluid chamber, and decoupling means for decoupling the coupling members to enable the energy storage device to use stored potential energy to actuate the pump in reverse to urge a burst of fluid from the fluid chamber through the fluid outlet; wherein the drive is configured to move the second coupling member reciprocally along a second linear path which is co-axially aligned with the first linear path.

The pump assembly preferably forms part of a dental cleaning appliance, which comprises a nozzle for delivering a burst of fluid to the teeth of a user. The appliance may be in the form of a dedicated interproximal cleaning appliance for cleaning between the gaps in the user's teeth. Alternatively, the appliance may be in the form of a toothbrush which has the additional function of improved interproximal cleaning through the emission of a burst of working fluid into the interproximal gap. As the nozzle is moved between adjacent teeth of the user, the user may depress a button of a user interface provided on a handle of the appliance to actuate the pump assembly to cause a burst of working fluid to be ejected from the nozzle. Alternatively, the appliance may be configured to actuate the delivery of working fluid to the teeth of the user automatically depending on the magnitude of an output from a sensor for detecting that the nozzle is located within an interproximal gap. For example, the sensor may be in the form of a light detector, such a camera or a light sensor, for receiving light, such a visible light or infrared light, reflected from a user's teeth. As another alternative, the appliance may be configured to actuate the delivery of working fluid to the teeth of the user automatically at a fixed frequency, for example between 0.5 and 5 Hz.

In a third aspect, the present invention provides a dental cleaning appliance comprising a handle; a fluid reservoir for storing a working fluid; and a fluid delivery system for receiving working fluid from the fluid reservoir, and for delivering a burst of working fluid to the teeth of a user; wherein the fluid delivery system comprises a pump assembly as aforementioned.

The pump assembly is preferably located within the handle of the appliance. The appliance preferably comprises a head, and a stem extending between the head and the handle. The nozzle preferably protrudes outwardly from the head. A plurality of bristles may be attached to a static section of the head, which section is not moveable relative to the handle. Alternatively, or additionally, a plurality of bristles may be attached to a moveable section of the head, which section is moveable relative to the handle. In a preferred embodiment, the appliance comprises a brush unit comprising a bristle carrier and a plurality of bristles mounted on the bristle carrier, with the bristle carrier being moveable relative to the handle.

The fluid reservoir preferably has a capacity in the range from 5 to 50 ml. For example, a fluid reservoir having a capacity of 25 ml, used in combination with a pump assembly which ejects bursts of fluid each having a fluid capacity of up to 0.25 ml, can supply a sufficient quantity of working fluid to the fluid chamber to allow up to 100 bursts of 0.25 ml of working fluid to be delivered to the teeth of a user.

The fluid reservoir is preferably refillable. The fluid reservoir thus preferably comprises a fluid port through which the fluid reservoir may be replenished with working fluid by the user. The fluid port may be located in a wall which delimits the fluid reservoir, or it may be located remotely from the fluid reservoir and placed in fluid communication with the fluid reservoir by a fluid conduit which extends from the fluid port to the fluid reservoir.

The handle of the appliance may comprise the fluid reservoir. For example, the fluid reservoir may be fully contained within the body of the handle. Alternatively, an external wall of the handle may at least partially delimit the fluid reservoir. At least part of that external wall may be transparent to allow a user to see the volume of working fluid contained within the fluid reservoir. To replenish such a fluid reservoir, the fluid port may be exposed manually by the user through moving a cover on the body of the handle, or through removing a bung or other closure device from the fluid port.

The fluid reservoir may be housed within the stem. As above, an external wall of the stem may at least partially delimit the fluid reservoir, and at least part of that external wall may be transparent to allow a user to see the volume of working fluid contained within the fluid reservoir.

As an alternative to housing the fluid reservoir within the stem, the fluid reservoir may be connected to the stem so as to be located externally of the stem. This can allow the fluid reservoir to be detached from the stem for replenishment or replacement as required. Alternatively, the fluid reservoir may be partially delimited by an external wall which is connected to the stem. Again, at least part of that external wall may be transparent to allow a user to see the volume of working fluid contained within the fluid reservoir. To maximize the capacity of the fluid reservoir and to provide for a relatively even weight distribution about the longitudinal axis of the appliance, the fluid reservoir preferably extends about, or surrounds, the stem.

Features described above in connection with the first aspect of the invention are equally applicable to each of the second and third aspects of the invention, and vice versa.

BRIEF DESCRIPTION OF THE DRAWINGS

Preferred features of the present invention will now be described by way of example only with reference to the accompanying drawings, in which:

FIG. 6(a) is a cross-sectional view of the pump assembly in a first configuration in a first operational mode, FIG. 6(b) is a close up of area N in FIG. 6(a), and FIG. 6(c) is a close up of area S in FIG. 6(a);

FIG. 7(a) is a cross-sectional view of the pump assembly in a second, primed configuration in the first operational mode, and FIG. 7(b) is a close up of area L in FIG. 7(a);

FIG. 8 is a cross-sectional view of the pump assembly in a third configuration in the first operational mode;

FIG. 9 is a cross-sectional view of the pump assembly in a fourth configuration in the first operational mode;

FIG. 10(a) is a cross-sectional view of the pump assembly in a first configuration in a second operational mode, FIG. 10(b) is a close up of area P in FIG. 10(a), and FIG. 10(c) is a close up of area R in FIG. 10(a);

FIG. 12(a) is a cross-sectional view of the pump assembly in a third, primed configuration in the second operational mode, and FIG. 12(b) is a close up of area M in FIG. 12(a);

DETAILED DESCRIPTION OF THE INVENTION

Figure 1A:
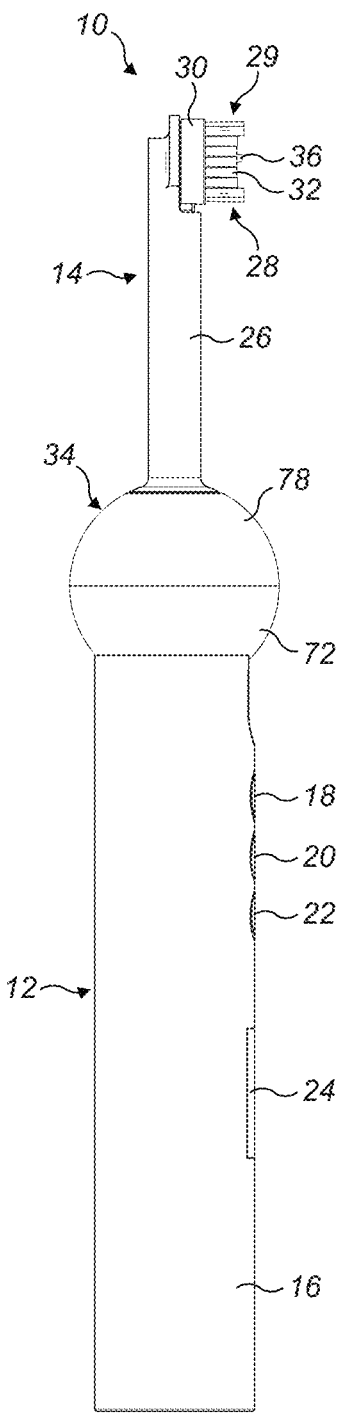
FIG. 1(a) is a right side view of a dental cleaning appliance.
Figure 1B:
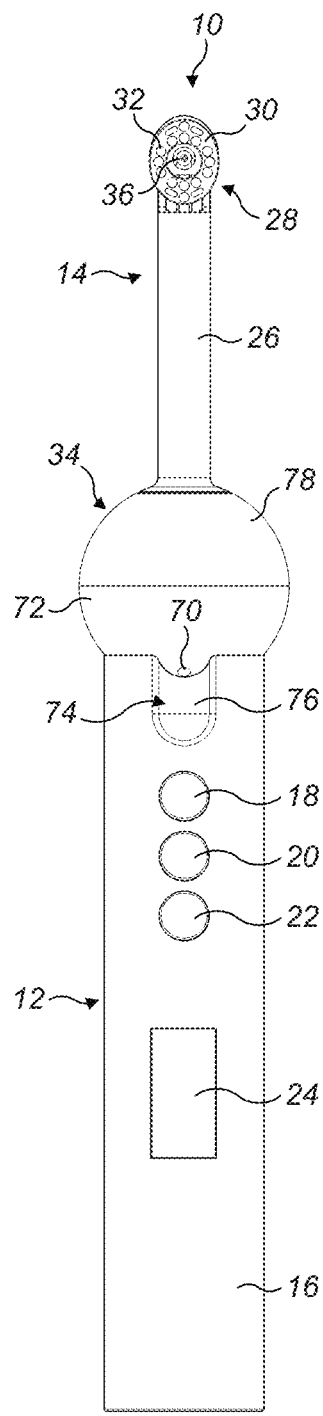
FIG. 1(b) is a front view of the appliance.
Figure 1C:
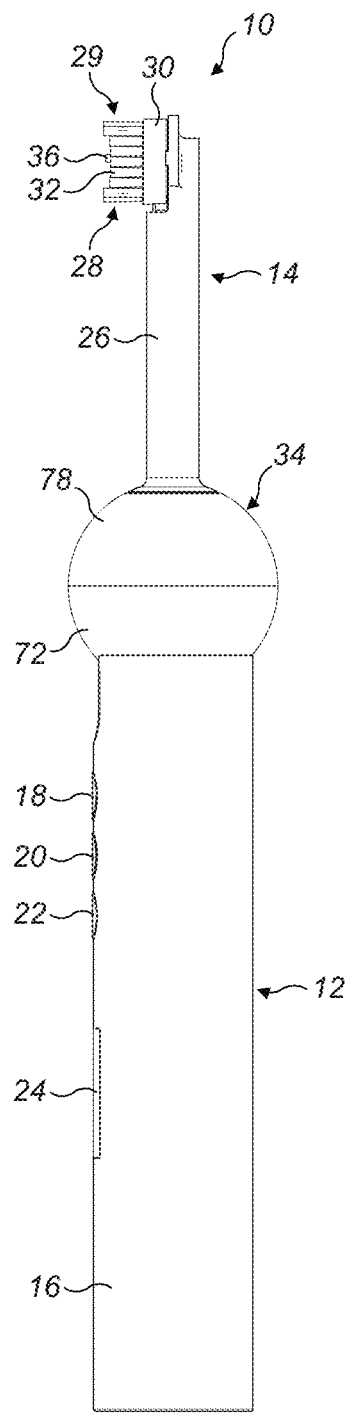
FIG. 1(c) is a left side view of the appliance.

FIGS. 1(a) to 1(c) illustrate external views of an embodiment of a dental cleaning appliance 10. In this embodiment, the appliance is in the form of a handheld appliance, which is in the form of an electric toothbrush having an integrated assembly for dispensing a working fluid for improved interproximal cleaning.

The appliance 10 comprises a handle 12 and a cleaning tool 14. The handle 12 comprises an external body 16 which is gripped by a user during use of the appliance 10. The body 16 is preferably generally formed from plastics material, and is preferably generally cylindrical in shape. The handle 12 comprises a plurality of user operable buttons 18, 20, 22 which are located within respective apertures formed in the body 16 so as to be accessible to the user. The handle 12 further comprises a display 24 which is positioned so as to be visible to a user during use of the appliance. In this embodiment, the display 24 is also located within a respective aperture formed in the body 16.

The cleaning tool 14 comprises a stem 26 and a head 28. The stem 26 is elongate in shape, which serves to space the head 28 from the handle 12 to facilitate user operability of the appliance 10. In this embodiment, the head 28 of the cleaning tool 14 comprises a brush unit 29, which comprises a bristle carrier 30 and a plurality of bristles 32 mounted on the bristle carrier 30. However, in other embodiments the cleaning tool 14 may be provided without a brush unit 29 so that the appliance is in the form of a dedicated interproximal cleaning appliance for cleaning between the gaps in the user's teeth.

The cleaning tool 14 also comprises a fluid reservoir 34 for storing a working fluid, and a nozzle 36 for delivering one or more bursts of working fluid to the teeth of the user during use of the appliance 10. The fluid reservoir 34 is connected to the stem 26. The fluid reservoir 34 extends at least partially around the stem 26. In this embodiment which includes a brush unit 29, the brush unit 29 extends at least partially around the nozzle 36.

Figure 2:
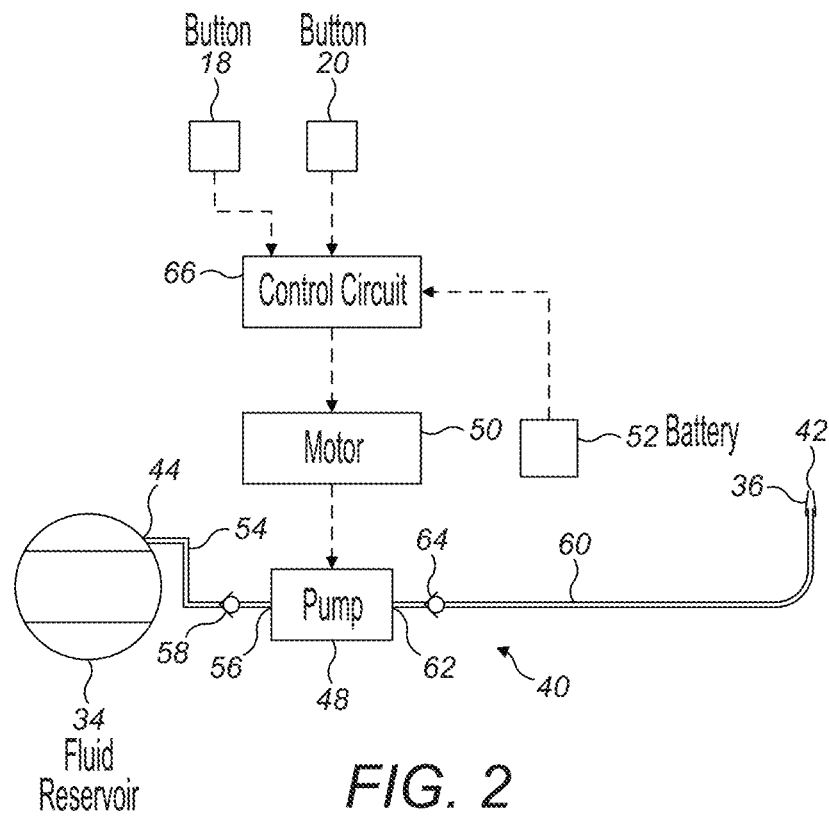
FIG. 2 illustrates schematically components of a fluid delivery system for delivering a burst of a working fluid to the teeth of a user.

The nozzle 36 forms part of a fluid delivery system 40 for receiving working fluid from the fluid reservoir 34 and for delivering bursts of working fluid to the teeth of a user during use of the appliance 10. The tip of the nozzle 36 comprises a fluid outlet 42 through which a burst of working fluid is delivered to the teeth of the user. The fluid delivery system 40 is illustrated schematically in FIG. 2. In overview, the fluid delivery system 40 comprises a fluid inlet 44 for receiving working fluid from the fluid reservoir 34. In this embodiment, the working fluid is a liquid working fluid, which is preferably water. The fluid delivery system 40 comprises a pump assembly 46 for drawing working fluid from the fluid reservoir 34 through the fluid inlet 44, and for delivering a burst of working fluid to the nozzle 36. The pump assembly 46 is located within the handle 12, and comprises a positive displacement pump 48 and a drive for driving the pump 48. The drive preferably comprises a motor 50 and a linear actuator connected to the motor 50 by a one or more gears (not shown) for converting rotary movement of the motor 50 into linear movement of the linear actuator. A battery 52 for supplying power to the motor 50 is also located in the handle 12. The battery 52 is preferably a rechargeable battery.

A first conduit 54 connects the fluid inlet 44 of the fluid delivery system 40 to a fluid inlet 56 of the pump 48. A first one-way valve 58 is located between the fluid inlet 44 and the pump 48 to prevent water from returning to the reservoir 34 from the pump 48. A second conduit 60 connects a fluid outlet 62 of the pump 48 to the nozzle 36. A second one-way valve 64 is located between the pump 48 and the nozzle 34 to prevent water from returning to the pump 48. A control circuit 66 controls the actuation of the motor 50, and so the motor 50 and the control circuit 66 provide a drive for driving the pump 48. The battery 52 supplies power to the control circuit 66. The control circuit 66 includes a motor controller, which supplies power to the motor 50.

In this embodiment, the control circuit 66 receives signals generated when the user depresses the buttons 18, 20, 22 located on the handle 12 of the appliance 10. Alternatively, or additionally, the control circuit 66 may receive signals which are generated by a sensor located within the appliance, or which are received from a remote device, such as a display or a personal device. For brevity, in the following description the control circuit 66 receives signals which are generated when the user operates one of the buttons 18, 20, 22.

As mentioned above, the fluid reservoir 34 is connected to, and extends at least partially around, the stem 26 of the cleaning tool 14. In this embodiment, the fluid reservoir 34 is annular in shape, and so surrounds the stem 26. The fluid reservoir 34 is preferably located at or towards the end of the stem 26 which is remote from the head 28. The fluid reservoir 34 preferably has a capacity in the range from 5 to 50 ml, and in this embodiment has a capacity of 25 ml.

The fluid inlet 44 is arranged to receive working fluid from the fluid reservoir 34. A filter may be provided in the fluid inlet 44 to prevent dirt from entering the fluid delivery system 40. With reference to FIG. 1(b), working fluid is supplied to the fluid inlet 44 from a fluid port 70 which is in fluid communication with the fluid reservoir 34. The fluid port 70 is located on an external collar 72 of the cleaning tool 14. The collar 72 is moveable relative to both the handle 12 and the stem 26 of the cleaning tool 14. In this embodiment, the collar 72 is rotatable relative to the handle 12 about the longitudinal axis of the cleaning tool 14. To move the collar 72 relative to the handle 12, the user grasps the handle 12 with one hand, and, with the other hand, turns the collar 72 about the longitudinal axis in the desired angular direction. The collar 72 is moveable relative to the handle 12 between first and second angular positions, which are separated by around 90°.

When the collar 72 is in the first position relative to the handle 12, as illustrated in FIG. 1(b), the fluid port 70 is exposed to allow the fluid reservoir 34 to be replenished by the user. The fluid port 70 is exposed by a recessed portion 74 of the body 16 of the handle 12. The recessed portion 74 comprises a curved wall 76. The curved wall 76 is shaped so that, during filling or replenishment of the fluid reservoir 34 by the user, working fluid is guided towards the exposed fluid port 70. When the collar 72 is in the second position relative to the handle 12, the fluid port 70 is occluded by the handle 12 so that the fluid port 70 is not accessible by the user. As the fluid port 70 also serves to supply working fluid to the fluid delivery system 40, in the second position the fluid port 70 is placed in fluid communication with the fluid inlet 44.

The collar 72 may be spaced from the fluid reservoir 34, but in this embodiment the collar 72 forms part of an external wall 78 of the fluid reservoir 34. The external wall 78 of the fluid reservoir 34 is thus moveable relative to the handle 12 and the stem 26 of the cleaning tool 14. The external wall 78 is preferably transparent to allow a user to observe the contents of the fluid reservoir 34, and so assess whether the fluid reservoir 34 requires replenishment prior to the desired use of the appliance 10.

Figure 3:
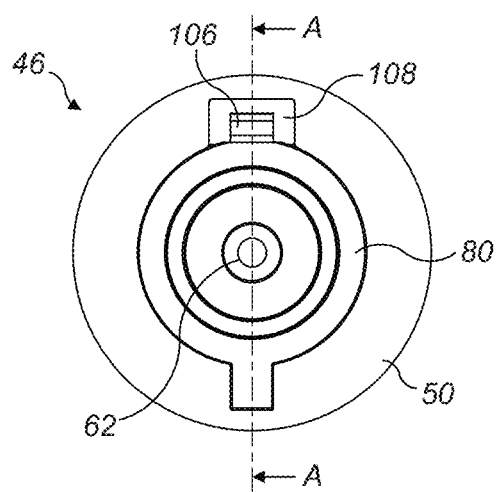
FIG. 3 is a front view of a pump assembly of the fluid delivery system.
Figure 4:
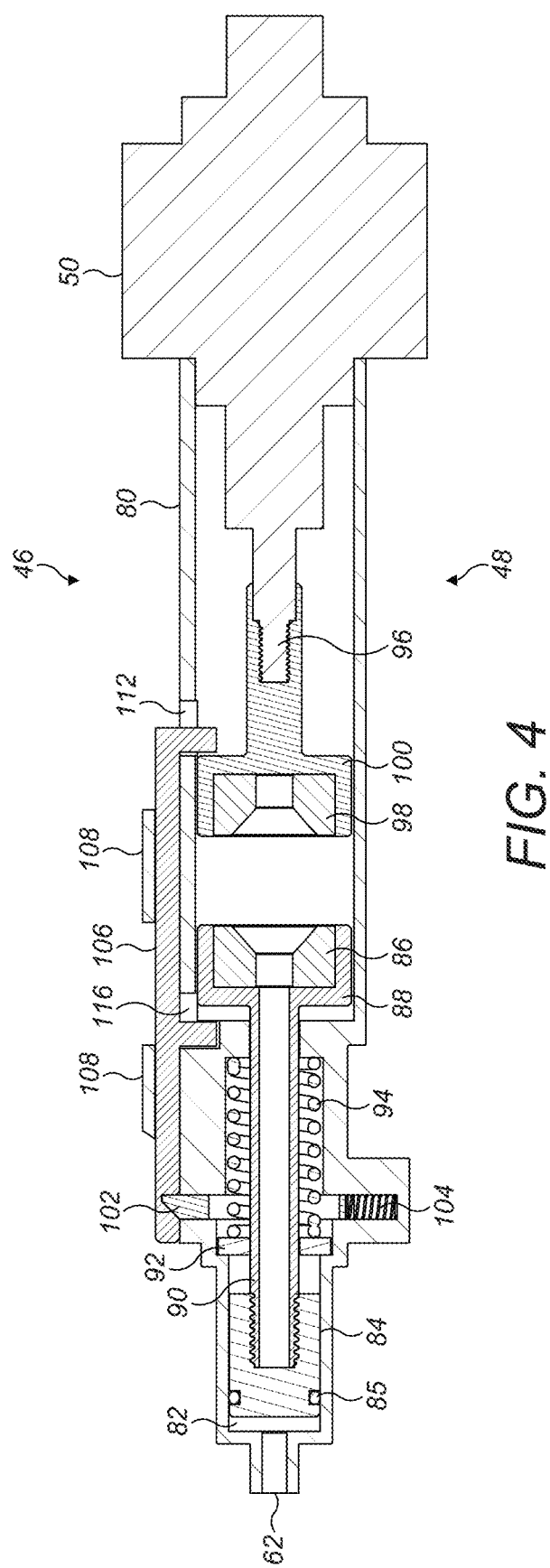
FIG. 4 is a cross-sectional view along line A-A in FIG. 3.
Figure 5:
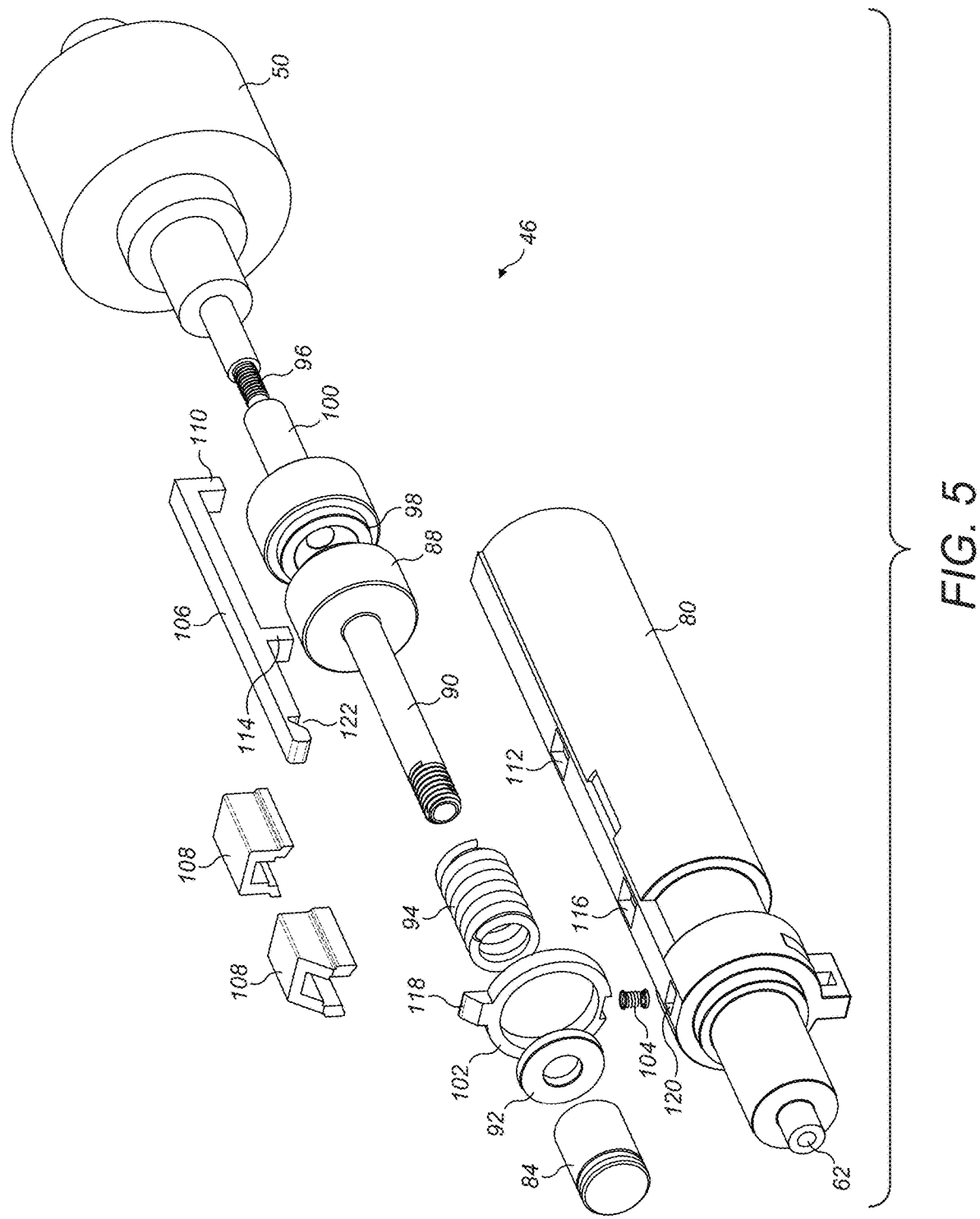
FIG. 5 is an exploded view of the pump assembly.
Figure 11:
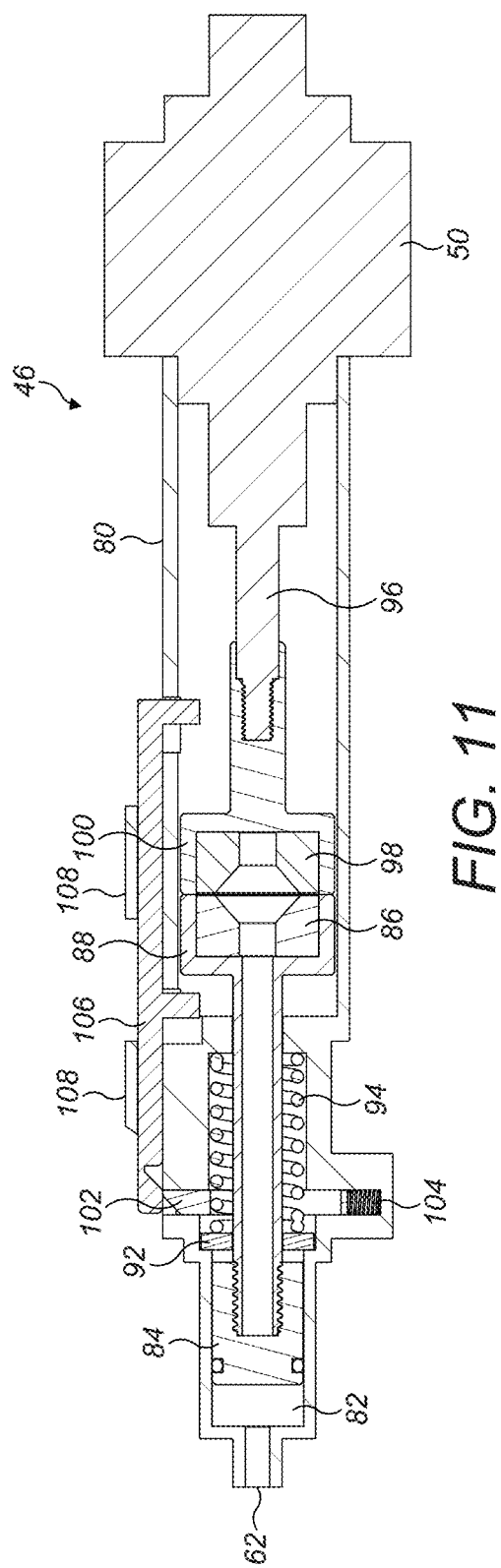
FIG. 11 is a cross-sectional view of the pump assembly in a second configuration in the second operational mode.

The pump assembly 46 is illustrated in FIGS. 3 to 5. The pump 48 comprises a pump housing 80 in which the fluid inlet 56 (located to the side of the pump housing 80 and so not visible in FIGS. 3 to 13) and the fluid outlet 62 are formed. The pump housing 80 defines a fluid chamber 82 for receiving fluid through the fluid inlet 56, and from which fluid is ejected through the fluid outlet 62.

The pump 48 comprises a fluid displacement member which is moveable relative to the fluid chamber 82 to draw fluid into the fluid chamber 82, and subsequently to urge fluid from the fluid chamber 82 towards the nozzle 36. The fluid displacement member is preferably reciprocally moveable relative to the fluid chamber. In this embodiment, the pump 48 is in the form of a piston pump, in which the fluid displacement member is a piston 84 which is moveable within the fluid chamber 82. The piston 84 is moveable in a first direction to draw fluid into the fluid chamber 82 from the fluid reservoir 34, and in a second direction, opposite to the first direction, to subsequently urge fluid from the fluid chamber 82 towards the nozzle 36. In this example, the piston 84 is a relatively rigid member which is moveable within the fluid chamber 82 along a first linear path between linearly spaced positions. A piston seal 85, which may be an O-ring, extends about the piston 84 to form a fluid-tight seal between the fluid chamber 82 and the piston 84. Alternatively, the pump may be in the form of a diaphragm pump, in which the fluid displacement member is a diaphragm bounding one side of the fluid chamber 82. In such a pump, the diaphragm is moveable, through flexing thereof, between different configurations to pump fluid.

The piston 84 forms part of a driven assembly that is driven by the drive of the pump assembly 46. The driven assembly also comprises a first coupling member 86 for coupling the piston 84 to the drive. In this embodiment, the first coupling member 86 comprises a first permanent magnet which is retained within a first magnet holder 88. The first magnet holder 88 is connected to, and is preferably integral with, one end of a connecting rod 90 of the driven assembly. The first magnet holder 88 is preferably formed from material which conducts magnetic flux, such as a ferritic stainless steel or a magnetic plastic. The piston 84 is connected to the other end of the connecting rod 90. The connecting rod 90 is linear in shape, and has a longitudinal axis which passes through the centre of the piston 84.

The pump 48 further comprises a drive plate 92. The drive plate 92 is annular in shape and extends about the connecting rod 90 so as to be disposed between the piston 84 and the first coupling member 86. The diameter of the central aperture of the drive plate 92 is greater than the external diameter of the connecting rod 90 so that the connecting rod 90 and the other components of the driven assembly which are connected to the connecting rod 90 are moveable relative to the drive plate 92.

The pump assembly 46 further comprises an energy storage device which converts kinetic energy generated during the actuation of the pump 48 by the drive into potential energy which is stored by the energy storage device. In this embodiment, the energy storage device is in the form of a first spring 94 provided within the pump housing 80. The first spring 94 is a compression spring. As shown in FIG. 4, the first spring 94 has a first end which engages the pump housing 80 and a second end which engages the drive plate 92 to urge the drive plate 92 in the second direction.

The linear actuator comprises a drive rod 96 which is connected to the motor 50 via one or more gears which convert rotary motion of the motor 50 into linear motion of the drive rod. The drive rod 96 is co-axially aligned with the connecting rod 90 of the driven assembly. A second coupling member 98 for coupling with the first coupling member 86 is connected to the free end of the drive rod 96. The drive rod 96 is connected to the motor 50 so that, with operation of the motor 50, the second coupling member 98 moves along a second linear path which is co-axially aligned, or collinear, with the first linear path. In this embodiment, the second coupling member 98 comprises a second permanent magnet, of reverse polarity to the first permanent magnet, which is retained within a second magnet holder 100 connected to the drive rod 96. The second magnet holder 100 is preferably formed from the same material as the first magnet holder 98.

As described in more detail below, the pump assembly 46 is operable in a number of operational modes. In a first operational mode, the volume of fluid drawn into, and subsequently ejected from, the pump 48 is relatively high. In a second operational mode, the volume of fluid drawn into, and subsequently ejected from, the pump 48 is relatively low. In the first operational mode, the volume of fluid drawn into, and subsequently ejected from, the pump 48 is preferably in the range from 0.15 to 0.25 ml. In the second operational mode, the volume of fluid drawn into, and subsequently ejected from, the pump 48 is preferably in the range from 0.05 to 0.20 ml.

The mode in which the pump assembly 46 operates is controlled by the drive in accordance with an input from the control circuit 66, for example in response to the user depressing button 20 of the handle 16. In this embodiment, the drive is configured to change the operational mode of the pump assembly 46 through changing the position of a moveable stop 102 for selectively engaging the drive plate 92. The moveable stop 102 is moveable between a stowed position, in which the pump assembly 46 operates in the first operational mode, and a deployed position, in which the pump assembly 46 operates in the second operational mode and in which the moveable stop 102 is positioned to engage the drive plate 92. In this embodiment, the moveable stop 102 is in the form of an annular disc which extends about the connecting rod 90. The moveable stop 102 comprises a central aperture which has a diameter which is larger than the external diameter of the drive plate 92 so that, when the moveable stop 102 is in its stowed position, the drive plate 92 passes through the central aperture without engaging the moveable stop 102. When the moveable stop 102 is moved to its deployed position, part of the moveable stop 102 moves into the path of the drive plate 92.

The moveable stop 102 is urged towards its stowed position by a second spring 104. The second spring 104 is in the form of a compression spring. As shown in FIG. 4, the second spring 104 has a first end which engages the pump housing 80 and a second end which engages the moveable stop 102 to urge the moveable stop 102, in a direction which is orthogonal to the first and second directions, towards its stowed position. In this embodiment, the actuator 106 is in the form of an arm located external to, and extending along, the pump housing 80. The actuator 106 is held adjacent to the pump housing 80 by a pair of retainers 108 connected to the pump housing 80 so that the actuator 106 can slide relative to the pump housing 80.

As described in more detail below, the actuator 106 is moveable between a first actuator position, in which the moveable stop 102 is in the stowed position, and a second actuator position, in which the moveable stop 102 is in the deployed position. The drive is arranged to move the actuator 106 between the two actuator positions. The actuator 106 comprises a first finger 110 which protrudes into the pump housing 80 through a first aperture 112 for selective engagement by the drive, in this embodiment by the second magnet holder 100 of the drive, to move the actuator 106 from the first actuator position to the second actuator position. The actuator 106 further comprises a second finger 114 which protrudes into the pump housing 80 through a second aperture 116 for selective engagement by the driven assembly, in this embodiment by the first magnet holder 88 of the driven assembly, to move, under the action of the drive, the actuator 106 from the second actuator position to the first actuator position.

The moveable stop 102 comprises a wedge-shaped protrusion 118 which, when the moveable stop 102 is in its stowed position, protrudes through an aperture 120 of the pump housing 80 into a conformingly-shaped recess 122 formed in the actuator 106. With reference to FIGS. 6(*b*) and 7(*b*), when the moveable stop 102 is in its stowed position, the drive plate 92 is moveable between a first stop 124 and a second stop 126, towards which the drive plate 92 is urged by the first spring 94. The stops 124, 126 are defined by facing surfaces of the pump housing 80. With reference to FIGS. 10(*b*) and 11(*b*), when the moveable stop 102 is in its deployed position, the drive plate 92 is moveable between the moveable stop 102 and the second stop 126.

Operation of the pump assembly 46 when in the first operational mode, in which the moveable stop is in its stowed position, will now be described with reference to FIGS. 6 to 9. FIGS. 6(*a*) to 6(*c*) illustrate the configuration of the pump assembly 46 when there is no fluid within the fluid chamber 82. As shown in FIG. 6(*a*), the first and second coupling members 86, 88 are coupled together through magnetic attraction so that the pump 48 is connected to the drive. The driven assembly is positioned, under the action of the drive, relative to the pump housing 80 so that the piston 84 is in its first position. As shown in FIG. 6(*c*), through the movement of the piston 84 to its first position by the drive the first magnet holder 88 has engaged the second finger 114 of the actuator 106 to position the actuator 106 in its first actuator position. This allows the moveable stop 102 to be moved, under the action of the second spring 104, to its stowed position in which the wedge-shaped protrusion 118 is located within the recess 122 of the actuator 106, as shown in FIG. 6(*b*). The drive plate 92 is urged against the second stop 126 by the first spring 94.

To draw a volume of fluid into the fluid chamber 82, the control circuit 66 operates the motor in a first motor direction to move the drive rod 96 in a first linear direction so as to move the piston 84 away from its first position. In this embodiment, the drive rod 96 moves piston 84 moves at an average speed of around 15 mm/sec to move the piston 84 away from its first position towards the second position, as shown in FIGS. 7(*a*) to 7(*b*). As the piston 84 moves towards its second position, the piston 84 engages the drive plate 92 at a third position located between the first position and the second position. Consequently, as the piston 84 moves from the third position to the second position, the first spring 94 becomes compressed, converting kinetic energy into potential energy which is stored by the compressed first spring 94. The compressed first spring 94 thus acts on the drive plate 92 so as to urge the drive plate 92, and so the piston 84 engaging the drive plate 92, towards the first position.

The force of the first spring 94, urging the piston 84 towards the first position, is lower than the magnetic force of attraction between the coupling members 86, 98 so that the pump 48 remains coupled to the drive as the piston 84 moves towards the second position. When the piston 84 has reached the second position, the drive plate 92 engages the first stop 124 to inhibit movement of the piston 84 beyond the second position.

When the piston 84 is located in its second position, the pump assembly 46 is in a primed configuration. The pump assembly 46 is maintained in this primed configuration until the user operates the button 18 of the handle 16 to actuate the delivery of a burst of working fluid from the nozzle 36.

When the user operates the button 18, the control circuit 66 operates the motor 50 in the first motor direction to move the drive rod 96 in the first linear direction. This has the effect of moving the second coupling member 98 away from the first coupling member 86. Due to the relatively high motor torque required to move the second coupling member 98 away from the first coupling member 86, the drive rod 96 moves at a reduced speed of around 10 mm/sec. As the second coupling member 98 moves away from the first coupling member 86, the magnetic force of attraction between the coupling members 86, 98 rapidly decreases. When the second coupling member 98 has moved away from the first coupling member 86, preferably by a distance in the range from 0.5 to 1.0 mm and in this embodiment around 0.75 mm, the force of the first spring 94, which urges the piston 84 towards its first position, becomes greater than the force of attraction between the coupling members 86, 98, which acts in the opposite direction. As a result, the pump 48 becomes decoupled from the drive, which enables the compressed first spring 94 to use its stored potential energy to expand and actuate the pump 48 in reverse. The piston 84 moves rapidly back towards its first position under the action of the first spring 94 to urge a burst of working fluid through the fluid outlet 62 towards the nozzle 36. The time taken for the pump assembly 46 to move from the primed configuration to one in which the second coupling member 98 has moved sufficiently far away from the first coupling member 86 to decouple the first coupling member 86 from the second coupling member 98, and thus decouple the pump 48 from the drive, is preferably in the range from 5 to 30 ms, more preferably between 5 and 15 ms and in this embodiment is around 8 ms.

The configuration of the pump assembly 46 immediately after a burst of working fluid has been ejected from the fluid chamber 82 is illustrated in FIG. 8. The drive plate 92 has been urged against the second stop 126 by the first spring 94. Due to the resistance of the fluid, which is preferably water, within the fluid chamber 82, the piston 84 does not return completely to its first position, but comes to rest at a position located between the first position and the third position, and so a small volume of fluid remains in the fluid chamber 82.

Immediately after the burst of fluid has been ejected from the fluid chamber 82, the pump assembly 46 is returned to the primed configuration. First, the motor 50 is operated by the control circuit 66 in a reverse motor direction to move the drive rod 96 in a second linear direction to move the second coupling member 98 towards the first coupling member 86. As there is a relatively low motor torque required to move the second coupling member 98 towards the first coupling member 86, the drive rod 96 moves at an increased speed of around 25 mm/sec.

When an amount of fluid remains in the fluid chamber 82 after the fluid ejection, the second coupling member 98 engages the first coupling member 86 when the pump assembly 46 is in the configuration shown in FIG. 9. The time taken for the drive to recouple to the pump 48 is preferably in the range from 0.10 to 0.25 seconds, and in this example is around 0.16 seconds. However, in the event that no fluid remained in the fluid chamber 82 after the fluid ejection, for example if there was insufficient fluid remaining in the fluid reservoir 34 and the first fluid conduit 54 to enable the fluid chamber 82 to be filled when the fluid assembly 46 was moved to its primed configuration, then the second coupling member 98 engages the first coupling member 86 when the pump assembly 46 is in the configuration shown in FIG. 6(*a*). The position at which the second coupling member 98 becomes coupled to the first coupling member 86 can be detected by the control circuit 66, for example from signals received from one or more of (i) a Hall effect sensor for detecting either the position, relative to the pump housing 80, at which the second coupling member 98 becomes coupled to the first coupling member 86 or the deceleration of the first coupling member 86 as the piston 84 moves towards its first position, (ii) a capacitive sensor for detecting the density of fluid within the fluid chamber 82, and (iii) a vacuum switch for detecting the fluid pressure at the fluid inlet 56 of the pump 48. In the event that the control circuit 66 detects that the second coupling member 98 has engaged the first coupling member 86 when the pump assembly 46 is in the configuration shown in FIG. 6(*a*), then the control circuit 66 can stop the motor 50 and generate an alert on the display 24 to advise the user to replenish the fluid reservoir 34. Once the fluid reservoir 34 has been replenished by the user, the user can clear the alert using one of the button 18, 20, 22 on the handle 12 to enable the control circuit 66 to continue the movement of the pump assembly 46 to the primed configuration.

With the drive now coupled to the pump 48, the control circuit 66 operates the motor in the first motor direction to return the piston 84 to its second position. The time taken for the pump assembly 46 to move from the configuration illustrated in FIG. 9 back to the primed configuration is preferably in the range from 0.2 to 0.4 seconds. The distance traveled by the piston 84 as it moves between these two configurations is preferably in the range from 3 to 5 mm, and in this embodiment is around 4 mm.

Provided that there is sufficient fluid stored in the fluid reservoir 34 to allow the fluid chamber 84 to be replenished, the time taken for the pump assembly 46 to return to the primed configuration to eject a second burst of fluid after the user has operated the button 18 to eject the first burst of fluid is preferably in the range from 0.4 to 0.6 seconds, and is preferably around 0.5 seconds. This allows the pump assembly 46 to be operated to eject bursts of fluid at a frequency of around 2 Hz.

To change the operational mode of the pump assembly 46 to the second operational mode, in this embodiment the user depresses button 20 of the handle 12. From the primed configuration of the pump assembly 46, as illustrated in FIG. 7(*b*), the motor 50 is operated in the first motor direction to move the drive rod 96 in the first linear direction to move the second coupling member 98 away from the first coupling member 86, which results in the ejection a burst of fluid from the pump outlet 62. In contrast to the operation of the drive in the first operational mode, following fluid ejection the operation of the motor 50 in the first motor direction is continued so that the second coupling member 98 continues to move away from the first coupling member 86 so that the pump assembly 46 adopts the configuration illustrated in FIGS. 10(*a*) to 10(*c*). As the pump assembly 46 moves towards this configuration, the second magnet holder 100 engages the first finger 110 of the actuator 106 to move the actuator 106 from the first actuator position to the second actuator position, illustrated in FIGS. 10(*a*) to 10(*c*). As the actuator 106 moves away from its first actuator position, the tip of the wedge-shaped protrusion 118 of the moveable stop 102 slides along the inclined surface of the recess 122, which has the effect of causing the moveable stop 102 to move away from the stowed position towards the deployed position against the force of the second spring 104. With particular reference to FIG. 10(*b*), when the moveable stop 102 is in its deployed position the wedge-shaped protrusion 118 is positioned outside of the recess 122 and a part of the moveable stop 102 is located in the path of the drive plate 92, between the drive plate 92 and the first stop 124.

Immediately after the pump assembly 46 has been placed in the second operational mode, the pump assembly 46 is returned to a primed configuration in which a reduced volume of fluid is stored in the fluid chamber 84. To place the pump assembly 46 in the primed configuration, the motor 50 is first operated by the control circuit 66 in the reverse motor direction to move the drive rod 96 in the second direction so as to move the second coupling member 98 towards the first coupling member 86. When an amount of fluid remains in the fluid chamber 82 after the fluid ejection, the second coupling member 98 engages the first coupling member 86 when the pump assembly 46 is in the configuration shown in FIG. 11, but if not the control circuit 66 detects the lack of fluid in the fluid chamber 82 as in the first operational mode and generates an alert for the user to replenish the fluid reservoir 34.

Once the drive has become coupled to the pump 48, the control circuit 66 operates the motor in the first motor direction to move the drive rod 96 in the first direction, and so move the piston 84 towards its second position to draw a volume of fluid into the fluid chamber 82. As the piston 84 moves towards its second position, the piston 84 again engages the drive plate 92 at the third position so that, as the piston 84 moves from the third position towards the second position, the piston 84 is moved against the force of the compressed first spring 94, which acts on the drive plate 92 so as to urge the drive plate 92, and so the piston 84 engaging the drive plate 92, towards the first position. However, in this second operational mode, before the piston 84 reaches the second position the drive plate 92 engages the moveable stop 102 to inhibit movement of the piston 84 beyond a position intermediate the third position and the second position, as shown in FIGS. 12(a) and 12(b), with the result that a smaller volume of fluid is drawn into the fluid chamber 82 before the movement of the piston 84 is inhibited by a stop.

The pump assembly 46 is maintained in this primed configuration until the user operates the button 18 of the handle 16 to actuate the delivery of a burst of working fluid from the nozzle 36. When the user operates the button 18, the control circuit 66 operates the motor 50 in the first motor direction to move the drive rod 96 in the first direction and so move the second coupling member 98 away from the first coupling member 86. As in the first operational mode, as the second coupling member 98 moves away from the first coupling member 86, the magnetic force of attraction between the coupling members 86, 98 rapidly decreases. When the second coupling member 98 has moved away from the first coupling member 86, preferably by a distance in the range from 0.5 to 1.0 mm and in this embodiment around 0.75 mm, the force of the first spring 94, which urges the piston 84 towards its first position, becomes greater than the force of attraction between the coupling members 86, 98, which acts in the opposite direction. As a result, the pump 48 becomes decoupled from the drive, which enables the compressed first spring 94 to use its stored potential energy to expand and actuate the pump 48 in reverse. The piston 84 moves rapidly back towards its first position under the action of the first spring 94 to urge a burst of working fluid through the fluid outlet 62 towards the nozzle 36.

Figure 13:
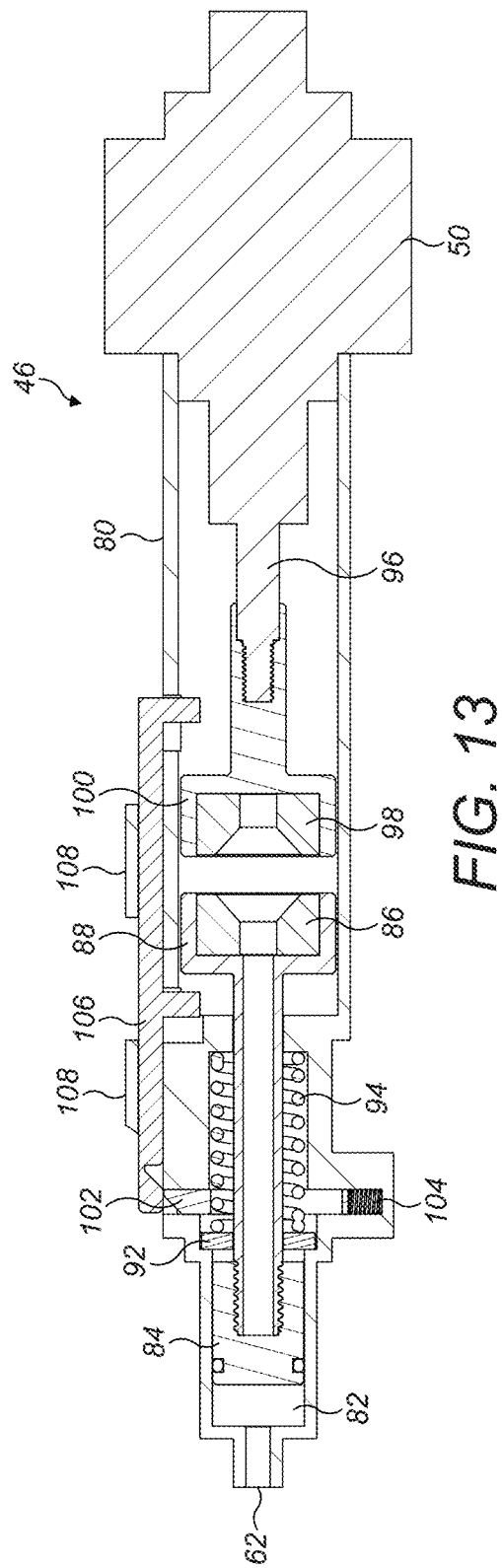
FIG. 13 is a cross-sectional view of the pump assembly in a fourth configuration in the second operational mode.

The configuration of the pump assembly 46 immediately after a burst of working fluid has been ejected from the fluid chamber 82 is illustrated in FIG. 13. Immediately after the burst of fluid has been ejected from the pump assembly 46, the pump assembly 46 is returned to a primed configuration.

The pump assembly 46 may also be operated in a purge mode to empty fluid from the section of the fluid delivery system located upstream from the pump 48, that is, from the fluid reservoir 34 and the first fluid conduit 54. The operation of the pump assembly 46 in the purge mode may be initiated by the user through operating button 22 on the handle 12. With the pump assembly 46 in a primed configuration in either of the two operational modes, when the purge mode is selected by the user the control circuit 66 operates the motor in the first motor direction to cause a burst of fluid to be ejected from the fluid chamber 82 and so from the nozzle 36. As above, once that burst of fluid has been ejected from the fluid chamber 82 the motor 50 is subsequently operated by the control circuit 66 in the reverse motor direction to move the second coupling member 98 towards the first coupling member 86 to couple the piston 84 to the drive. In this purge mode, the motor 50 is operated by the control circuit 66 to oscillate the piston 84 rapidly between the first position and the third position to, in turn, draw a relatively small volume of fluid into the fluid chamber 82 from the fluid reservoir 34 and eject that volume of fluid from the fluid chamber 82. As the piston 84 is not being moved against the force of the first spring 94, the motor torque requirement is relatively low, which allows the motor 50 to be operated in the purge mode at a relatively fast speed, for example so as to move the drive rod 96 at a speed in the range from 25 to 50 mm/sec, to oscillate the piston 84 between the first and third positions. Once the fluid ejection from the pump assembly 46 has stopped, the user may stop the purge mode through operating button 22 of the handle 12.

Figure 14A:
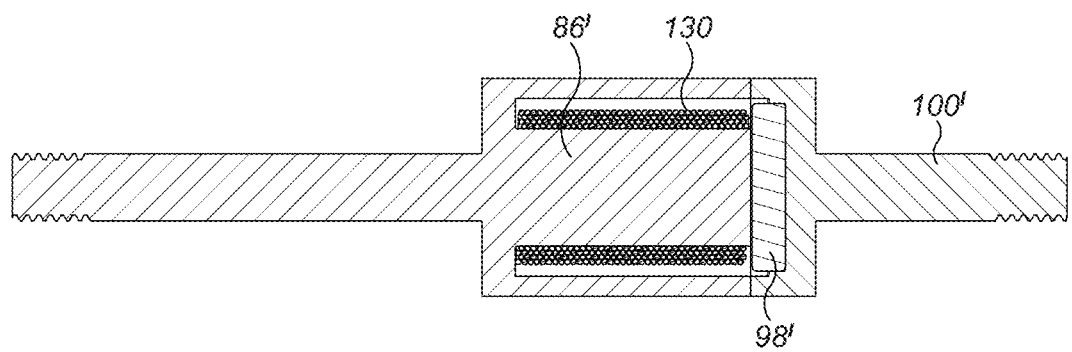
FIG. 14(a) is a cross-sectional view of alternative coupling members for coupling together the drive and the pump of the pump assembly.
Figure 14B:
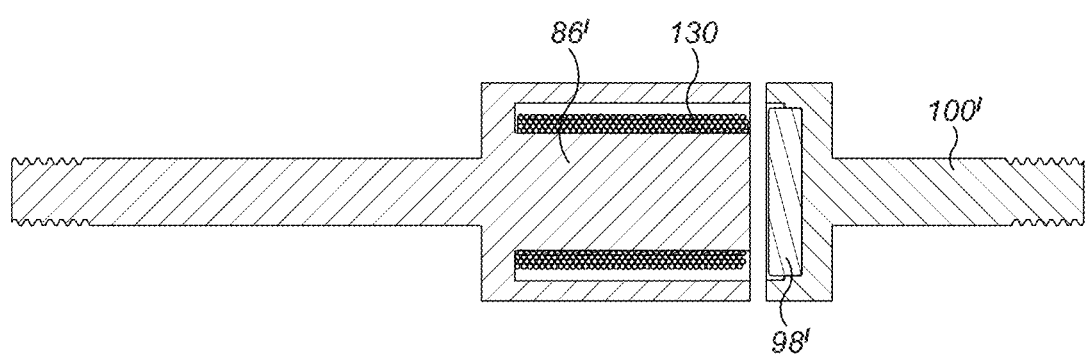
FIG. 14(b) illustrates the coupling members when the pump is decoupled from the pump.

In the embodiment described above, each of the first coupling member 86 and the second coupling member 98 comprises a respective permanent magnet. FIGS. 14(a) and (b) illustrate an alternative arrangement in which the first coupling member 86' comprises ferromagnetic material, and is preferably forms an extension of the first magnet holder 88. The moveable stop 102, second spring 104 and actuator 106 are replaced by a coil 130 which extends about the first coupling member 86'. The coil 130 is connected to the control circuit 66. As described above, the second coupling member 98' comprises a permanent magnet retained within a magnet holder 100'.

As above, the first and second coupling members 86, 98 couple together through magnetic attraction so that the pump 48 is connected to the drive. To disconnect the pump 48 from the drive, for example when the piston 84 has been moved to a selected position within the fluid chamber 82, the coil 130 is energized by the control circuit 66 to generate a magnetic field interferes with the magnetic field generated by the permanent magnet. The size of the coil 130 and the current supplied to the coil 130 are selected so that, when the coil 130 is energized, the magnetic field generated by the coil 130 has the effect of reducing the force of the attraction between the coupling members such that the force of the first spring 94, which urges the piston 84 towards its first position, becomes greater than the force of attraction between the coupling members, which acts in the opposite direction. As a result, the pump 48 becomes decoupled from the drive, which enables the compressed first spring 94 to use its stored potential energy to expand and actuate the pump 48 in reverse to urge fluid from the fluid chamber 82. Once that actuation of the pump 48 by the first spring 94 has been performed, the coil 130 is de-energized by the control circuit 66 to allow the drive to be operated as described above to re-couple the pump 48 to the drive. Depending on the size of the magnetic field generated by the energized coil 130, the pump 48 may be disconnected from the drive when the piston 84 is located at any selected position between the first position of the piston 84 and the second position of the piston 84.

The invention claimed is:
1. A pump assembly for a dental cleaning appliance, the pump assembly comprising:
a positive displacement pump comprising a fluid chamber having a fluid inlet connectable to a source of fluid, a fluid outlet, and a fluid displacement member;
a drive for actuating the positive displacement pump to move the fluid displacement member relative to the fluid chamber along a first linear path to draw fluid into the fluid chamber through the fluid inlet;
an energy storer that converts kinetic energy generated during actuation of the positive displacement pump by the drive into potential energy, and stores the potential energy;
a first coupling member connected to the fluid displacement member so that the first coupling member moves with the fluid displacement member and a second coupling member connected to the drive, the coupling members coupling together to enable the drive to actuate the positive displacement pump to draw fluid into the fluid chamber, and
a decoupler for decoupling the coupling members to enable the energy storer to use stored potential energy to actuate the positive displacement pump in reverse to urge a burst of fluid from the fluid chamber through the fluid outlet;

wherein the drive is configured to move the second coupling member reciprocally along a second linear path which is co-axially aligned with the first linear path; wherein the drive comprises a motor; wherein the coupling members couple magnetically; and wherein the decoupler is configured to decouple the coupling members so that the coupling members are spaced apart.

2. The pump assembly of claim 1, comprising a connecting rod which connects the first coupling member to the fluid displacement member.

3. The pump assembly of claim 2, wherein the fluid displacement member and the first coupling member are located at opposite ends of the connecting rod.

4. The pump assembly of claim 1, wherein the drive further comprises a linear actuator connected to the motor and the second coupling member, and a control circuit for driving the motor to move the second coupling member relative to the fluid chamber.

5. The pump assembly of claim 1, wherein the fluid displacement member is moveable from a first position to a second position to draw fluid into the fluid chamber through the fluid inlet.

6. The pump assembly of claim 5, wherein the decoupler comprises a stop for inhibiting movement of the fluid displacement member beyond the second position.

7. The pump assembly of claim 6, wherein, in an operational mode, the drive is configured to (a) move the second coupling member in a first direction to engage the first coupling member to connect the positive displacement pump to the drive, (b) subsequently move the second coupling member in a second direction, opposite to the first direction, to move the fluid displacement member to the second position, and (c) continue to move the second coupling member in the second direction to decouple the coupling members to release the positive displacement pump from the drive, whereupon the fluid displacement member moves towards the first position, under the action of the energy storer, to urge a burst of fluid through the fluid outlet.

8. The pump assembly of claim 6, wherein the stop is connected to the fluid chamber.

9. The pump assembly of claim 6, wherein the stop is provided by a wall of a housing of the positive displacement pump.

10. The pump assembly of claim 6, comprising a drive plate which moves with the fluid displacement member as the fluid displacement member is moved from a third position, which is intermediate the first position and second position, towards the second position, and wherein the stop is arranged to engage the drive plate to inhibit movement of the fluid displacement member beyond the second position.

11. The pump assembly of claim 10, wherein the energy storer comprises a spring which engages the drive plate.

12. The pump assembly of claim 11, wherein the drive is selectively operable in a purge mode, in which it is configured to reciprocally move the fluid displacement member between the first position and the third position to draw a volume of fluid through the fluid inlet and subsequently urge that volume of working fluid through the fluid outlet.

13. The pump assembly of claim 10, comprising a second stop for preventing the drive plate from engaging the fluid displacement member when the fluid displacement member is located between the first position and the third position.

14. The pump assembly of claim 13, wherein the second stop is connected to the fluid chamber.

15. The pump assembly of claim 13, wherein the second stop is provided by a wall of a housing of the positive displacement pump.

16. The pump assembly of claim 6, wherein the decoupler comprises a moveable stop which is moveable between a stowed position and a deployed position for inhibiting movement of the fluid displacement member beyond an intermediate position located between the first position and the second position.

17. The pump assembly of claim 16, comprising a spring for urging the moveable stop towards the stowed position and an actuator for selectively moving the moveable stop, against the force of the spring, towards the deployed position.

18. The pump assembly of claim 17, wherein the drive is arranged to move the actuator from a first actuator position, for allowing the spring to urge the moveable stop towards the stowed position, to a second actuator position for moving the moveable stop towards the deployed position.

19. A dental cleaning appliance comprising:
a handle;
a fluid reservoir for storing a working fluid; and
a fluid delivery system for receiving working fluid from the fluid reservoir, and for delivering a burst of working fluid to the teeth of a user;
wherein the fluid delivery system comprises the pump assembly of claim 1.

* * * * *